United States Patent [19]

Trescott

[11] Patent Number: 4,832,451
[45] Date of Patent: May 23, 1989

[54] COLLIMATOR TARGETS

[75] Inventor: Patrick J. Trescott, Daytona Beach, Fla.

[73] Assignee: The United States of America as represented by the Secretary of the Army, Washington, D.C.

[21] Appl. No.: 874,302

[22] Filed: Jun. 9, 1986

[51] Int. Cl.$^4$ .......................... G02B 27/00; G01B 9/00
[52] U.S. Cl. ..................................... 350/321; 350/318; 350/1.7; 250/339; 250/504 R; 244/3.16; 273/348.1; 356/124
[58] Field of Search ............... 350/321, 322, 314, 316, 350/318, 1.1, 1.6, 1.7, 171, 172, 641; 356/124; 250/338, 339, 503.1, 504 R, 505.1, 227, 347; 244/3.16; 273/348.1

[56] References Cited

U.S. PATENT DOCUMENTS

| | | | |
|---|---|---|---|
| 3,630,809 | 12/1971 | Edwards | 350/318 |
| 3,901,997 | 8/1975 | Groth | 350/1.7 |
| 4,107,529 | 8/1978 | Chicklis et al. | 250/339 |
| 4,199,218 | 4/1980 | Steinhage et al. | 250/504 |
| 4,279,599 | 7/1981 | Marshall et al. | 273/348.1 |
| 4,366,141 | 12/1982 | Martin et al. | 350/1.1 |
| 4,405,132 | 9/1983 | Thalmann | 273/348.1 |
| 4,422,646 | 12/1983 | Rosa | 273/348.1 |
| 4,442,166 | 4/1984 | Fan | 350/1.1 |
| 4,605,232 | 8/1986 | Hundstad | 350/1.7 |
| 4,643,518 | 2/1987 | Taniguchi | 350/1.6 |

FOREIGN PATENT DOCUMENTS 1381873 1/1975 United Kingdom ............... 356/124

*Primary Examiner*—John K. Corbin
*Assistant Examiner*—Loha Ben
*Attorney, Agent, or Firm*—Norman L. Wilson, Jr.

[57] ABSTRACT

In the field of optics, collimators are adapted not only for testing, calibrating and measuring instruments, but for target projection and simulation. The technique is to use standard targets which are commonly available as target sets, such as three-bar and area targets. Such standard targets, although in wide use, are subject to certain disadvantages, particularly when the light source is not in the human visible range. Targets used with this radiation are subject to mechanical constraints. Since, like stencils, they are dependent upon cut-outs, images formed are subject to the same limitations as stencils. That is, bands or strips must support the cut-out image. By this invention, mechanical constraints of cut-outs in targets now employed are obviated, and many of the thermal limitations of such targets are alleviated.

5 Claims, 2 Drawing Sheets

COLLIMATOR TARGETS

BACKGROUND OF THE INVENTION

This invention relates to collimators, and more specifically, to targets or reticles therefor.

In the field of optics, collimators are adapted not only for testing, calibrating and measuring instruments as described in U.S. Pat. Nos. 4,422,758, 4,022,533, 3,966,328, 3,915,575, 3,518,005 and *IEEE Transactions on Instrument and Measurement*, Vol. TARGET-34, No. 1, Mar. 1985, at page 51, but for target projection and simulation. Their use in calibrating and measuring instruments is attributable to their proficiency in producing parallel light rays. The use of collimators in target simulation is based on their far-field response. Placing a target in the focal plane of a collimator is a known technique for making a uniform target appear to be in the far-field. The image is said to be formed at infinity. The technique is to use standard targets which are commonly available as target sets. Such sets include three-bar and area targets. Three-bar targets are plates having equally spaced bars or slits, each about 0.32 cm. wide. Area targets are square aperture plates.

Standard targets, although in wide use, are nevertheless subject to certain disadvantages, particularly when the light source is not in the human visible range. Radiation at both ends of the spectrum is frequently used in collimators employed in instrument callibrating and target training. However, standard bar targets used with this radiation are subject to mechanical constraints. Since, like stencils, they are dependent upon cut-outs, images formed are subject to the same limitations as stencils. That is, bands or strips must support the cut-out image. Where the radiation entering the collimator is in the infrared range the targets are etched or otherwise cut out of metal foil. Mechanical constraints limit the size, area and precision of the target. In addition, the thermal effects of infrared absorption cause the noncutout portions of the target to undergo a temperature rise or drop. This results in a bleed-thru of the thermal radiation, and a lowering of the observed temperature change (delta T°) in the object plane. The longer the target is exposed to IR energy the greater this error will become.

By the practice of this invention, mechanical constraints of cut-outs in targets now employed are obviated, and many of the thermal limitations of such targets are alleviated.

SUMMARY OF THE INVENTION

The invention herein permits targets or reticles for collimators to be made in any shape or form. By the invention, any visual type target can be provided for use at nonvisible ends of the spectrum. The invention is based on transmisivity. A substrate solid which transmits radiation of the frequency of interest is employed. This substrate is then coated with a material which reflects radiation of the frequency of interest. By the use of nontransmitting coatings targets can be made in all designs and sizes.

DETAILED DESCRIPTION OF THE INVENTION

It will be appreciated that in target training it is advantageous to have a variety of different targets, showing different objects to be fired upon. Conventional bar targets do not fulfill such target requirements. Likewise in lens testing by forming an image of a target to determine diffraction and aberrations bar targets are not entirely satisfactory. Lens resolution must take into account both high and low contrast images. Hence, we must view the sequence of radiated areas of high and low contrasts, or high and low areances of a target. This variation of areances, i.e., amounts of radiation received per unit area, when expressed as a ratio is termed modulation, and how much modulation can be transferred from object to image is called modulation transfer.

Unfortunately, a given lens does not have a single, unique modulation transfer value. Instead, it varies as a function of spatial frequency. This means that we must rapidly scan the target to produce a sine wave from which a modulation transfer function (MTF) is derived. From the MTF an optical transfer function can be calculated. In general terms, the optical transfer function describes the degradation of an image of different spacial frequencies. If a conventional bar target is scanned a square wave rather than a sine wave is produced. From this square wave the sine Fourier transform must be computed. By the practice of this invention a sine wave target can be made yielding the modulation transfer directly, with no computations and hence, lower cost.

For a more complete understanding of the invention and its advantages a preferred embodiment thereof will be described in conjunction with FIGS. 1 thru 6 in the accompanying drawings.

Figure 1:
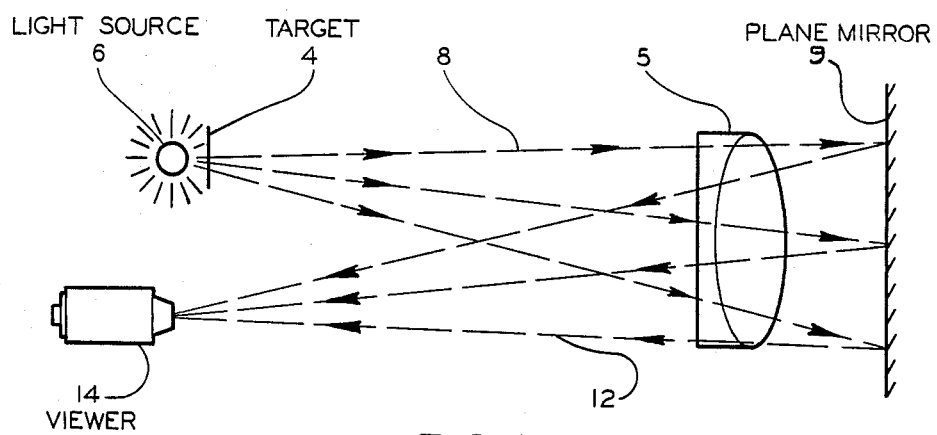
FIG. 1 is a diagrammatic representation of a collimator improved by this invention.

Referring first to FIG. 1, an off-axis collimator is illustrated. Target 4, illuminated by IR source 6 forms optical beam 8 passing through objective lens 5 to mirror 9. Optical beam 12 is reflected by mirror 9 to its focal point at 14 where an image is seen by a gunner using his night vision training device.

Figure 4:
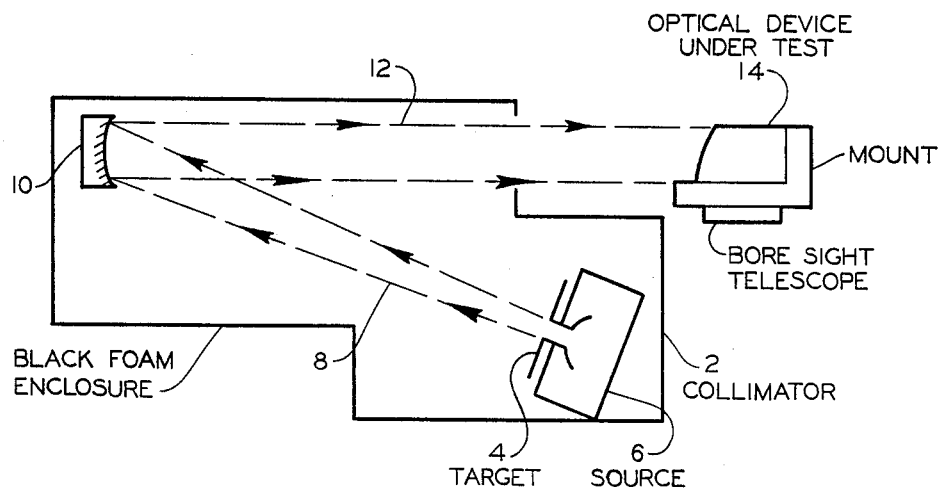
FIG. 4 shows another form of collimator as employed herein.

A similarly operating collimator 2 is shown in FIG. 4. By target 4 this instrument produces an infinitely distant image on the optical device 14 being tested. Target 4 will be illuminated by a radiant source 6, preferably, an infrared radiation (IR) source. The optical beam 8 emanating therefrom is reflected by collimator mirror 10, and as optical beam 12, it forms its image at viewer 14.

Figure 2:
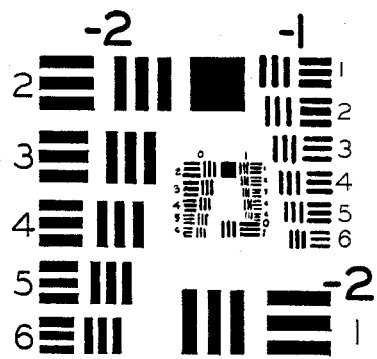
FIG. 2 shows a conventional target therefor.

As indicated hereinbefore, conventional targets are three bar targets such as those depicted in FIG. 2. It will be understood that the bars 1-6, shown in black, are cut out in the actual target, which is made of a plastic, metal or cardboard material. Clearly since these bars, or other image-forming patterns, must be cut out, there are physical limitations as in the case of stencils, particularly when an IR radiation light source is used. There are also thermal effects limiting the choice of substrate materials. The perfect material will pass all rays of interest and reflect 100%, all other radiation impinging thereupon without an excessive temperature rise.

For gunnery training purposes silhouettes or circular targets are desirable. These are not possible utilizing prior art targets, such as those in FIG. 2.

Figure 3:
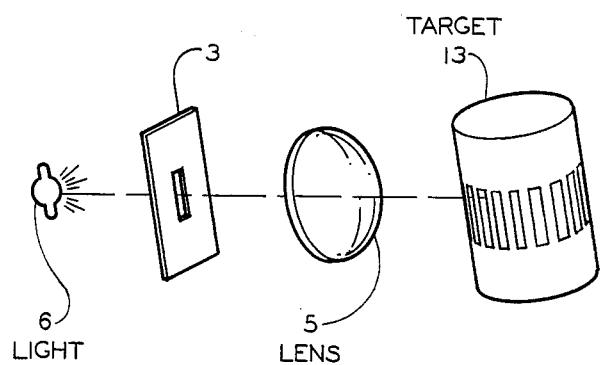
FIG. 3 shows a square wave target with a different spatial frequency.
Figure 6:
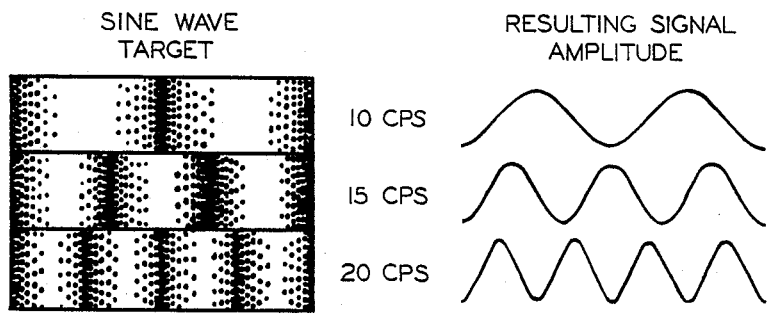

In determining the resolving power and contrast of a lens using a square wave target, a Fourier transform is required. With bar targets made to rotate as in the case of target 13 in FIG. 3, a square wave is obtained by the sensing device. A lens 5, a collimating slot 3 and light source 6 are also shown in FIG. 3. A Fourier transform requires extensive transformation computations, and therefore, the availability of a computer, to derive the sine waves required for modulation transfer factors. By the practice of this inventions, a reticle such as that shown in FIG. 6 can be made. As shown in that figure, sine waves of given frequencies can be obtained. The amplitude can be measured and the MTF can be obtained directly, eliminating the computer and calculations.

Figure 5:
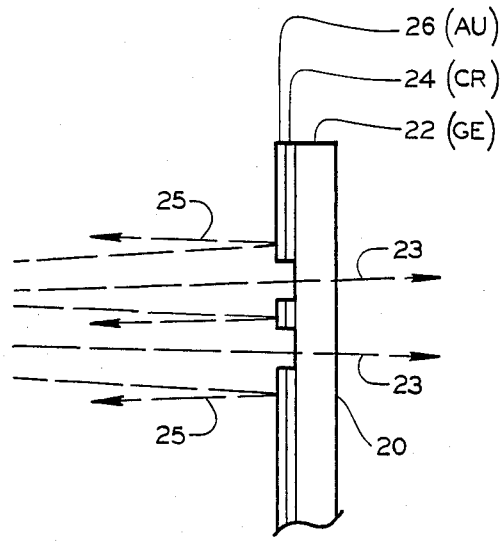
FIGS. 5, 6, 7 and 8 show collimator targets of this invention.

The fabrication of the target of this invention will be understood by referring to FIG. 5. Rather than a cardboard, plastic, or metal foil with cut out portions, target 20 of this invention is constructed of a base material such as germanium 22 which transmits infrared radiation 23 from an IR source. Other materials which can be employed for this target base or substrate are zinc sulfide, zinc selenide, magnesium fluoride, calcium fluoride, magnesium oxide other materials that will transmit IR radiation.

To form the pattern on the target base 22, a layer or coating is applied to the base. Such coating materials are, for example silver, gold, copper, aluminum, rhodium, and titanium and materials such as plastics which reflect IR radiaton. Other layers are reflective at the frequencies of interest.

It will be appreciated that multiple layers can also be used to form a stratum which reflects radiation as shown at by reflected rays 25 in FIG. 5. A desirable stratum is an outer layer 26 of gold deposited on a layer 24 of chromium. These layers are best applied by vapor deposition. However, the layers can also be applied by wet process plating, photographic, and printing processes, using reflective plating materials in lieu of inks and dyes. Thus, IR reticles can be made by the photographic dot process, screening processes, and photolithographic processes. The spatial frequency response of the collimating instrument will present the target in various degrees of shading due to the high frequency responses of such optical instruments. In applying these coatings, it is to be understood that the penetration depth is important since reflectively is a function of the thickness of the film. If film thickness is less than the wave length of the radiation, the radiation will not be reflected. By outer layers, we mean the layer closest to the IR source.

In operation, referring to FIG. 1, lens 5 can be a lens being tested, or any objective lens. Infrared radiation from lamp 6 passes through target 4 thru lens 5 to be reflected by mirror 9 to its focal point at 14. A detector or imaging device such as a FLIR or viewer enables gunner to practice. In the case of lens testing where target 4 will be that shown in FIG. 6, the viewer will be replaced by the light sensing surface of a detector storing images, i.e., pixels, for instruments determining the modulation transfer function of the lens.

It is apparent that this invention pertains to collimating optical devices and to instruments of the type utilizing bar and area aperture targets located in the collimator focal plane adjacent a radiation generating source. The frequency of the radiation is in the range to which a sensor used with the collimator is responsive so that the radiation passes through the apertures to produce an image being sensed. The improvement herein eliminates target apertures. A target in the form of a solid radiation transmitting sheet is provided. The sheet transports or transmits therethrough radiation of the frequency emanating from the radiation source. In combination with the radiation transmitting base or sheet is a radiation reflective opaque coating on the surface of the sheet which forms an image to be sensed by blocking out all radiation except the image-forming radiation.

Figure 7:
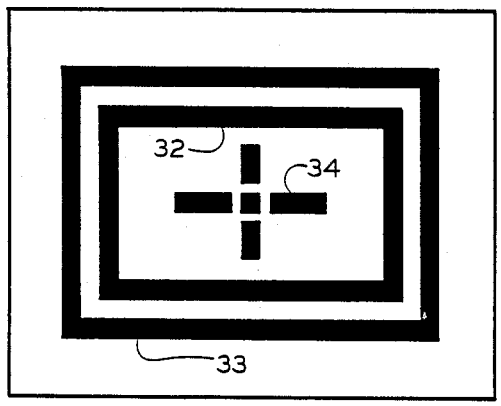
Figure 8:
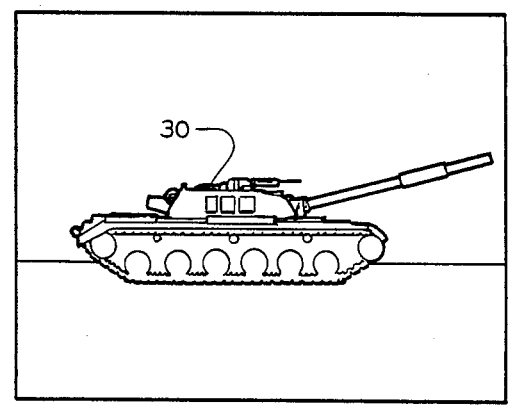

This invention thus replaces a standard four bar target and similar bar targets used to measure modulation or optical transfer functions. It can be seen that scenes such as the tank 30 (FIG. 8), or lines 32 and 33 shown in FIG. 7 can be used in collimator targets. Such targets were not possible heretofore because the center portion 34 would fall out. Obviously, various shapes and layer combinations will be obvious to those skilled in the art. Such ramifications and modifications are deemed to be withing the scope of this invention.

What is claimed is:

1. An improved collimator for testing and calibrating optical instruments, and for far-field image projection and simulation, the collimator including a target in the focal plane of the collimator, a viewing means, a radiation source, an objective lens, and a mirror, the improvement being a target not subject to mechanical constraints comprising a base substrate in the form of a solid material which transmits radiation emanating from the radiation source, in combination with a pattern on the substrate as a radiation reflective stratum having areas of high and low contrast so that the collimator presents the target as an image in various degrees of shading, the thickness of the reflective stratum being greater than the wave length of the radiation.

2. The collimator of claim 1 wherein the base substrate is germanium and the reflective stratum is a layer of gold over a layer of chromium forming a pattern for target training.

3. The collimator of claim 1 wherein the base substrate is zinc sulfide and the reflective stratum is in the form of an aluminum layer for testing the objective lens.

4. The collimator of claim 1 wherein the base substrate is zinc selenide and the reflective stratum is in the form of copper layer for testing the objective lens.

5. The collimator of claim 1 wherein the base substrate is magnesium oxide and the reflective stratum is in the form of circles of titanium for target training.

* * * * *